United States Patent [19]

Abe

[11] Patent Number: 4,986,070

[45] Date of Patent: Jan. 22, 1991

[54] PURGE CONTROL DEVICE FOR USE IN AN INTERNAL COMBUSTION ENGINE

[75] Inventor: Kazuo Abe, Susono, Japan

[73] Assignee: Toyota Jidosha kabushiki Kaisha, Toyota, Japan

[21] Appl. No.: 321,640

[22] Filed: Mar. 9, 1989

[30] Foreign Application Priority Data

Mar. 14, 1988 [JP] Japan .................... 63-32630[U]

[51] Int. Cl.⁵ .................... F01N 3/28; F02M 33/02
[52] U.S. Cl. .................... 60/285; 123/520
[58] Field of Search .............. 60/285, 283; 123/516, 123/518, 519, 520, 521

[56] References Cited

U.S. PATENT DOCUMENTS

| | | | |
|---|---|---|---|
| 4,013,054 | 3/1977 | Balsley | 123/519 |
| 4,148,188 | 4/1979 | Tokura | 60/285 |
| 4,454,846 | 6/1984 | Suzuki et al. | |
| 4,527,532 | 7/1985 | Kasai | 123/518 |
| 4,700,683 | 10/1987 | Uranishi | 123/519 |
| 4,809,667 | 3/1989 | Uranishi | 123/520 |

FOREIGN PATENT DOCUMENTS

| | | | |
|---|---|---|---|
| 59-103941 | 6/1984 | Japan . | |
| 59-126048 | 7/1984 | Japan . | |
| 233466 | 10/1987 | Japan | 123/519 |

Primary Examiner—Douglas Hart
Attorney, Agent, or Firm—Cushman, Darby & Cushman

[57] ABSTRACT

A purge control device comprising a determining unit and a control unit, whereby, when the determining unit determines that a catalyst arranged in a exhaust passage is in a state wherein hydrogen sulfide can be produced, the control unit reduces the amount of the purge gas purged from a charcoal canister and fed into an intake passage.

15 Claims, 5 Drawing Sheets

PURGE CONTROL DEVICE FOR USE IN AN INTERNAL COMBUSTION ENGINE

BACKGROUND OF THE INVENTION

1. Field of the Invention

The present invention relates to a purge control device for use in an internal combustion engine.

2. Description of the Related Art

It is well known in this field to fit a charcoal canister to an internal combustion engine as a part of a fuel vapor control system for the engine. The charcoal canister usually comprises a fuel vapor inlet connected to a fuel tank, a fuel vapor outlet connected to an intake passage in the vicinity of a throttle valve, and an air inlet connected to the intake passage upstream of the throttle valve and downstream of an air flow meter. In this system when the throttle valve is open, the fuel vapor outlet of the charcoal canister is connected to the intake passage downstream of the throttle valve, and consequently, a part of the air metered by the air flow meter at this time is fed into the charcoal canister, and the fuel component absorbed in activated carbons in the charcoal canister is desorbed by this air. The thus desorbed fuel component is then fed into the intake passage.

In this engine, however, when the temperature of exhaust gases fed into a catalyst of the exhaust emission system or the temperature of the catalyst bed is within a predetermined range, and when an air-fuel mixture fed into the engine cylinders temporarily becomes rich due to the supply of the purge gas purged from the charcoal canister, hydrogen sulfide (herein-after referred to as $H_2S$) is produced, and therefore, a problem arises in that an unpleasant and toxic odor is produced.

SUMMARY OF THE INVENTION

An object of the present invention is to provide a purge control device capable of reducing unpleasant odors emitted from the catalyst.

Therefore, according to the present invention, there is provided an internal combustion engine having an intake passage and an exhaust passage, comprising: a charcoal canister for storing fuel vapor therein; a catalyst arranged in the exhaust passage; a determining means for determining whether or not the catalyst is producing hydrogen sulfide and a control means for controlling the amount of purge gas purged from the charcoal canister and fed to the intake passage in accordance with a determination by the determining means, to reduce the amount of purge gas when the catalyst is producing hydrogen sulfide.

The present invention may be more fully understood from the description of preferred embodiments of the invention set forth below, together with the accompanying drawings.

DESCRIPTION OF THE PREFERRED EMBODIMENTS

Figure 1:
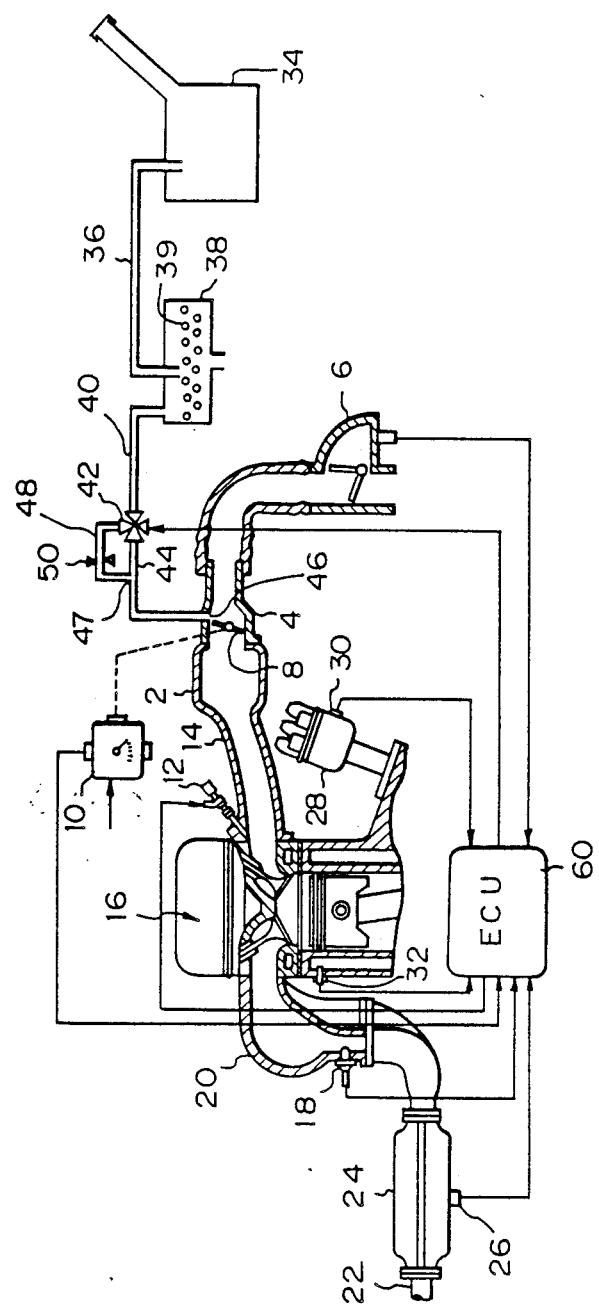
FIG. 1 is a schematically illustrated view of an engine.

Referring to FIG. 1, a surge tank 2 is connected to an air cleaner (not shown) via an intake duct 4 and an air flow meter 6, a throttle valve 8, which is connected to an acceleration pedal (not shown), is arranged in the intake duct 4, and a throttle sensor 10 for detecting a degree of opening of a throttle valve 8 is connected to the throttle valve 8. A fuel injector 12 is attached to an intake manifold 14 and injects fuel toward an intake port of an engine 16, and a oxygen concentration detecting sensor (hereinafter referred to as an $O_2$ sensor) 18 for detecting an air-fuel ratio is arranged in an exhaust manifold 20. A three-way catalyst 24 is disposed in an exhaust pipe 22 and a bed temperature sensor 26 for detecting a temperature of a bed of the three-way catalyst 24 is arranged in the three-way catalyst 24. A distributor 28 having a distribution shaft (not shown) rotated in accordance with the engine speed, is provided with a crank angle sensor 30 which generates pulses by which the engine speed is determined. A cooling water temperature sensor 32 for detecting a cooling water temperature of the engine 16 is arranged in a cylinder block.

Further, a fuel tank 34 is connected to a charcoal canister 38 via a vapor conduit 36, and fuel vapor produced in the fuel tank 34 is absorbed by activated carbon 39 in the canister 38. In addition, the canister 38 is connected to a purge control valve 42 via a first purge conduit 40, and the purge control valve 42 is connected to the intake duct 4 at a purge port 46 via a second purge conduit 44. This purge port 46 is open to the intake duct 4 upstream of the throttle valve 8 when the throttle valve 8 is in the idling position, and is open to the intake duct 4 downstream of the throttle valve 8 when the throttle valve 8 is open. The control valve 42 is connected to a connecting portion 47 of the second purge conduit 44 by a bypass conduit 48 having a throat portion 50 provided therein. A sum of a flow resistance of the bypass conduit 48 and the second purge conduit 44 from the connecting portion 47 to the purge port 46 is about three times as large as a flow resistance of the second purge conduit 44 from the control valve 42 to the purge port 46.

The control valve 42 can assume three operating positions. When in the first operating position, the control valve 42 communicates the first purge conduit 40 with the second purge conduit 44, and shuts off the bypass conduit 48, and therefore, when the throttle valve 8 is open, the fuel component absorbed in the activated carbon 39 is desorbed therefrom and fuel vapor is fed into the intake duct 4 from the second purge conduit 44. When in the second operating position, the control valve 42 communicates the first purge conduit 40 with the bypass conduit 48, and blocks the direct communication between the first and second purge conduits 40 and 44, and therefore, when the throttle valve 8 is open, only a small amount of the fuel vapor from the canister 38 is fed into the intake duct 4 via the bypass conduit 48. In this case, the amount of purge gas fed into the intake duct 4 is about one third of the amount fed when the control valve 42 is in the first operating position. When in the third operating position, the control valve 42 closes the first purge conduit 40, and therefore, fuel vapor from the charcoal canister 38 is not fed into the intake duct 4.

Further, an actual injection time TAU of the fuel injector 12 is calculated in an electronic control unit 60, from the following equation.

TAU=TP.FAF.FOTP

Where
TP: a basic injection time
FAF: a feedback correction coefficient
FOTP: an acceleration increasing correction coefficient In this equation, the basic injection time TP is calculated from the engine speed and the amount of air fed into the engine cylinders. The feedback correction coefficient FAF is controlled based on the output signal of the $O_2$ sensor 18, so that an air-fuel ratio becomes equal to the stoichiometric air-fuel ratio. The acceleration increasing correction coefficient FOTP is described hereinafter.

Figure 2:
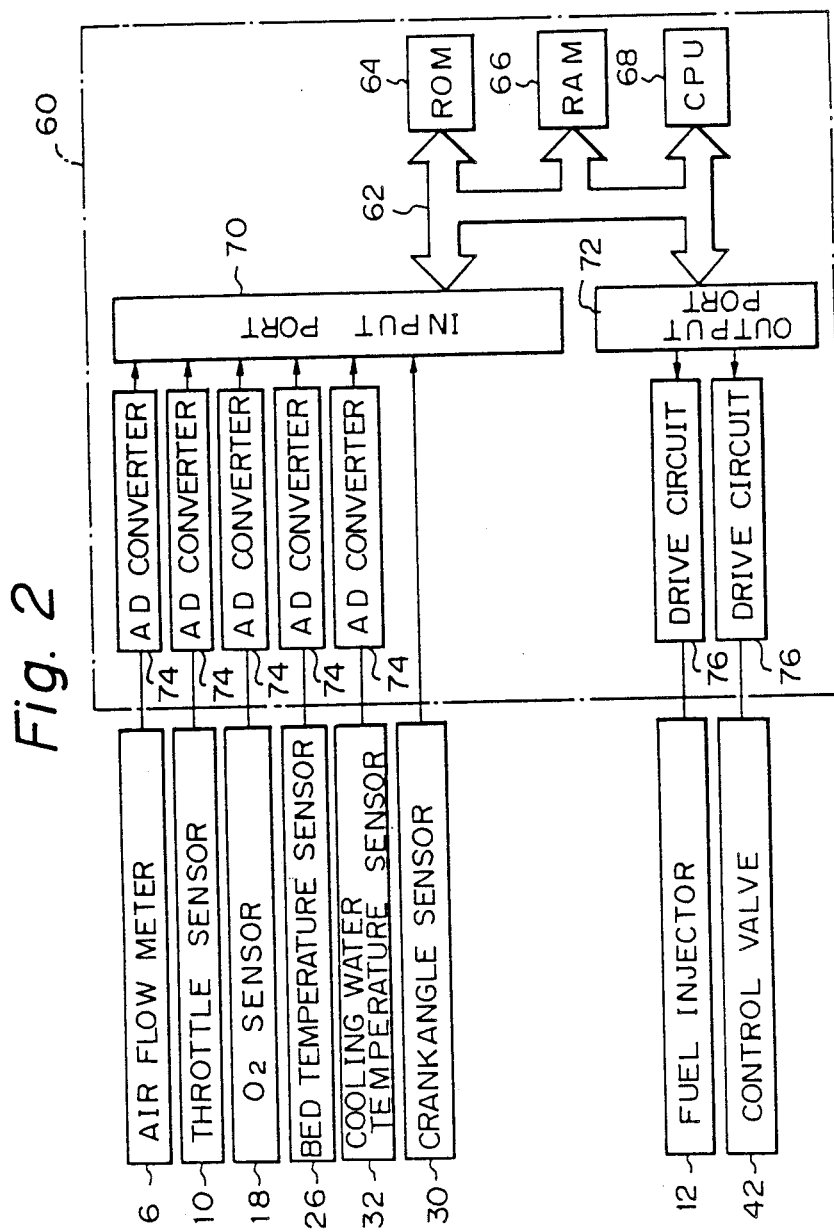
FIG. 2 is a block diagram of an electronic control unit.

Referring to FIG. 2, the electronic control unit 60 is constructed as a digital computer and comprises a ROM (read only memory) 64, a RAM (random access memory) 66, a CPU (microprocessor, etc.) 68, an input port 70, and an output port 72. The ROM 64, the RAM 66, the CPU 68, the input port 70, and the output port 72 are interconnected via a bidirectional bus 62. The input port 70 is connected to the air flow meter 6, the throttle sensor 10, the $O_2$ sensor 18, the catalyst bed temperature sensor 26, and the cooling water temperature sensor 32 via corresponding AD converters 74. The input port 70 is connected directly to the crank angle sensor 30.

The output port 76 is connected to the fuel injector 12 and the control valve 42 via corresponding drive circuits 76.

Figure 3:
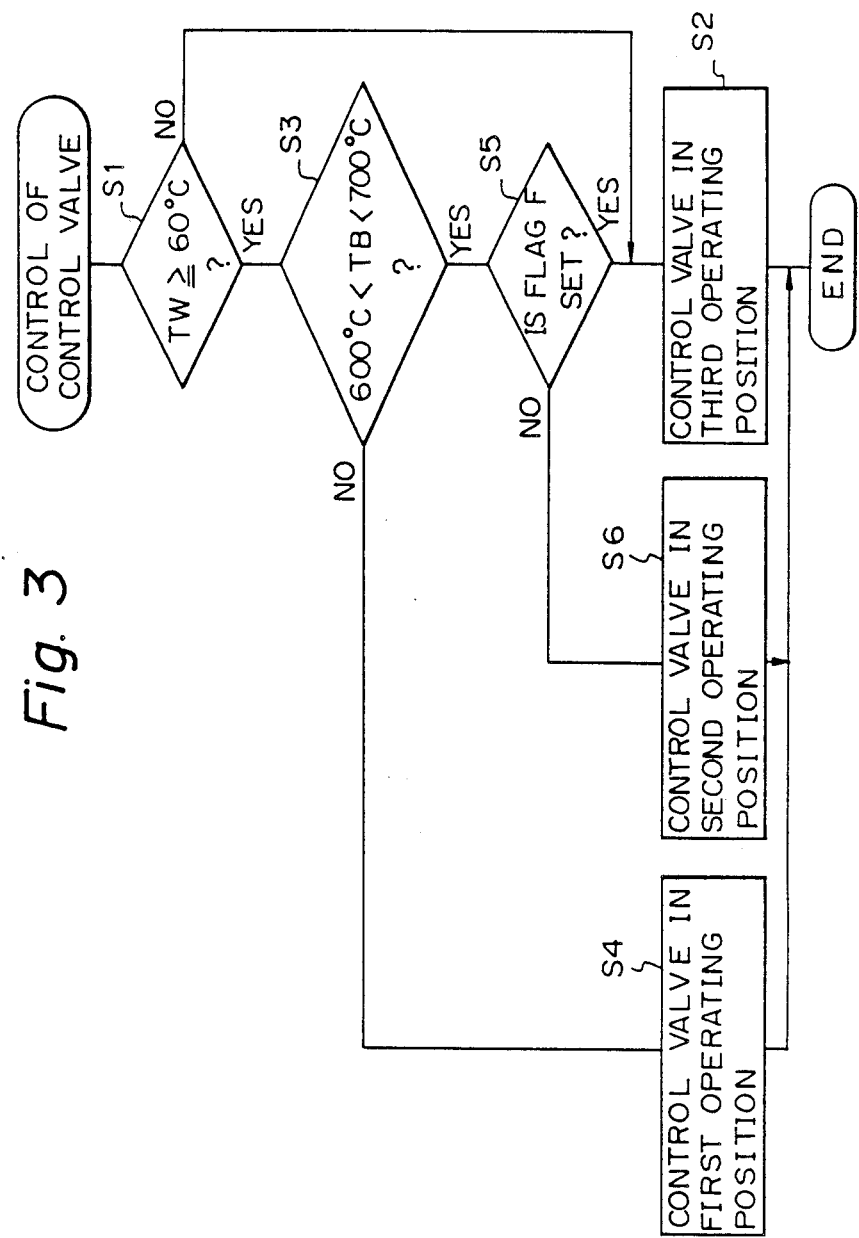
FIG. 3 is a flow chart for executing the control of the control valve.

FIG. 3 illustrates a flow chart for executing the control of the control valve 42 to control the amount of purge gas purged from the charcoal canister 38. The routine illustrated in FIG. 3 is processed by sequential interruptions executed at 50 msec. intervals.

In step S1, it is determined whether or not the cooling water temperature TW is equal to or higher than 60° C. If TW<60° C., the routine goes to step S2, and the control valve 42 is placed in the third operating position so that fuel vapor absorbed by the activated carbon 39 is not fed into the intake duct 4. Therefore, when the engine is cold, the engine operating state can be stabilized. If TW≧60° C., the routine goes to step S3, and it is determined whether or not the temperature TB of the catalyst bed of the three-way catalyst 24 is within a predetermined temperature range, for example, higher than 600° C. and lower than 700° C. If TB≦600° C. or TB≧700° C., as $H_2S$ cannot be produced, the routine goes to step S4, and the control valve 42 is placed in the first operating position, whereby the first purge conduit 40 is communicated with the second purge conduit 44. Therefore, when the throttle valve 8 is open, the normal supply of the purge gas is started and fuel vapor absorbed by the activated carbon 39 is fed into the intake duct 4. If TB>700< C., the routine goes to step S5, and it is determined whether or not a flag F is set. The flag F is set, when an injection time of the fuel injector 12 is made longer to make an air-fuel mixture fed into cylinders rich, i.e., the flag F is controlled by, for example, the acceleration increasing correction coefficient FOTP described hereinafter. If the flag F is not set, the routine goes to step S6, and the control valve 42 is placed in the second operating position, whereby the first purge conduit 40 is communicated with the second purge conduit 44 via the bypass conduit 48. Therefore, in this case, since the amount of the purge gas purged from the charcoal canister 38 is about one third of the amount of purge gas purged when the control valve 42 is in the first operating position, an air-fuel mixture fed into the engine cylinders does not become rich. Consequently, even if the temperature TB of the bed of the three-way catalyst 24 is higher than 600° C. and lower than 700° C., $H_2S$ is not produced by the three-way catalyst 24. In step S5, if the flag F is set, the routine goes to step S2, and a purge of the charcoal canister is not carried out. Accordingly, since the air-fuel mixture does not become rich, $H_2S$ is not produced.

Table 1 shows an example of a relationship among an amount of purge gas purged from the charcoal canister 38, the temperature TB of the bed of the three-way catalyst 24, and the flag F. When TB≦600° C. or TB≧700° C., a usual amount of purge gas is purged from the charcoal canister 38, defined as 10 in the Table. When TB is higher than 600° C. and lower than 700° C., and the flag F has been reset, the amount of gas is equal to 3. When the flag F has been set, the amount of purge gas is equal to 0, i.e., the supply of purge gas is stopped.

TABLE 1

| F | TB ≦ 600° C. | 600° C. < TB < 700° C. | TB ≧ 700° C. |
|---|---|---|---|
| RESET | 10 | 3 | 10 |
| SET | 10 | 0 | 10 |

In addition, as shown in Table 2, when the set flag F is set, the amount of purge gas may be stepwise changed into several separate amounts of purge gas in accordance with the temperature TB.

TABLE 2

| F | TB ≦ 600° C. | 600° C. < TB < 700° C. | TB ≧ 700° C. |
|---|---|---|---|
| RESET | 10 | 3 | 10 |
| SET | 8 | 0 | 6 |

Figure 4:
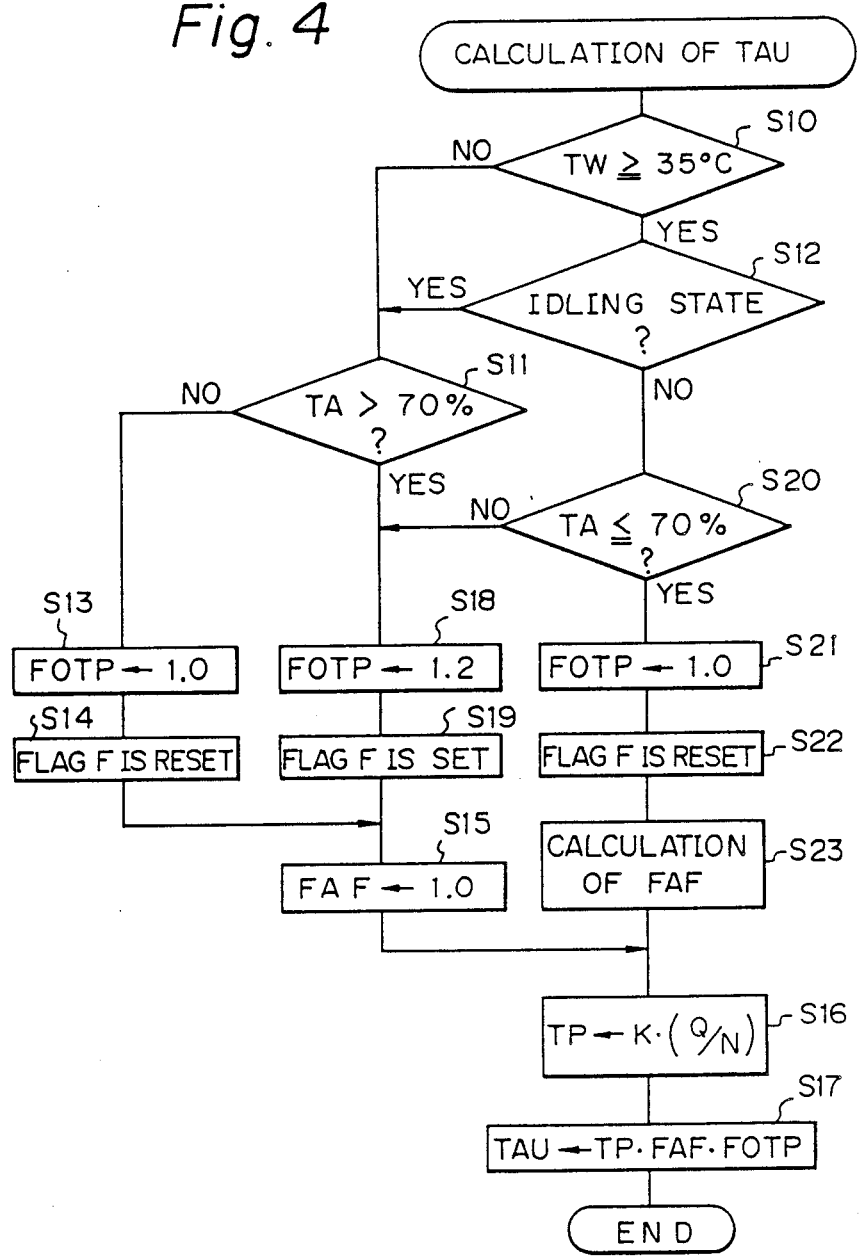
FIG. 4 is a flow chart for executing the calculation of the injection time TAU.

FIG. 4 illustrates a routine for the calculation of an actual injection time TAU. The routine illustrated in FIG. 4 is processed at a predetermined crank angle.

Referring to FIG. 4, in step S10, it is determined whether or not the cooling water temperature TW output by the cooling water temperature sensor 32 is equal to or higher than 35° C. If TW<35° C., the routine go step S11, and it is determined whether or not a degree TA of opening of the throttle valve 8 is larger than 70% of the fully open position, on the basis of signals output by the throttle sensor 10. In step S10, if TW≧35° C., the routine goes to step S12, and it is determined whether or not the engine is operating in an idling state, on the basis of signals output by the throttle sensor 10. If the engine is operating in an idling state, the routine goes to step S11. In step S11, if TA≦=70%, the routine goes to step S13, and 1.0 is memorized as FOTP. In step S14, the flag F is reset, and in step S15, 1.0 is memorized as a feed back correction coefficient FAF. In step S16, the basic injection time TP is calculated from the engine speed N and the amount of the air Q fed into the engine cylinders, on the basis of signals output by the crankangle sensor 30 and the air flow meter 6. In this step, K indicates a constant value, and Q/N corresponds to an engine load. Then, in step S17, TAU is calculated. In this case, TAU is calculated from the following equation.

$$TAU = TP$$

In step S11, if TA > 70%, the routine goes to step S18, and 1.2 is memorized as FOTP. Then, in step S19, the flag F is set, and in step S15, 1.0 is memorized as FAF. In this case, TAU is calculated from the following equation.

$$TAU = TP \cdot FOTP$$

and therefore, TP is made longer by FOTP to make an air-fuel mixture fed into cylinders rich.

In step S12, if the engine is not operating in an idling state, the routine goes to step S20, and it is determined whether or not a degree TA of opening of the throttle valve 8 is equal to or smaller than 70% of the fully open position. If TA > 70%, the routine goes to step S18, but if TA ≦ 70%, the routine goes to step S21, and 1.0 is memorized as FOTP. Then, in step S22, the flag F is reset, in step S23, FAF is calculated, and then the routine goes to step S16. In this case, a feed back control of the air-fuel ratio is carried out, and TAU is calculated from the following equation.

$$TAU = TP \cdot FAF$$

Figure 5:
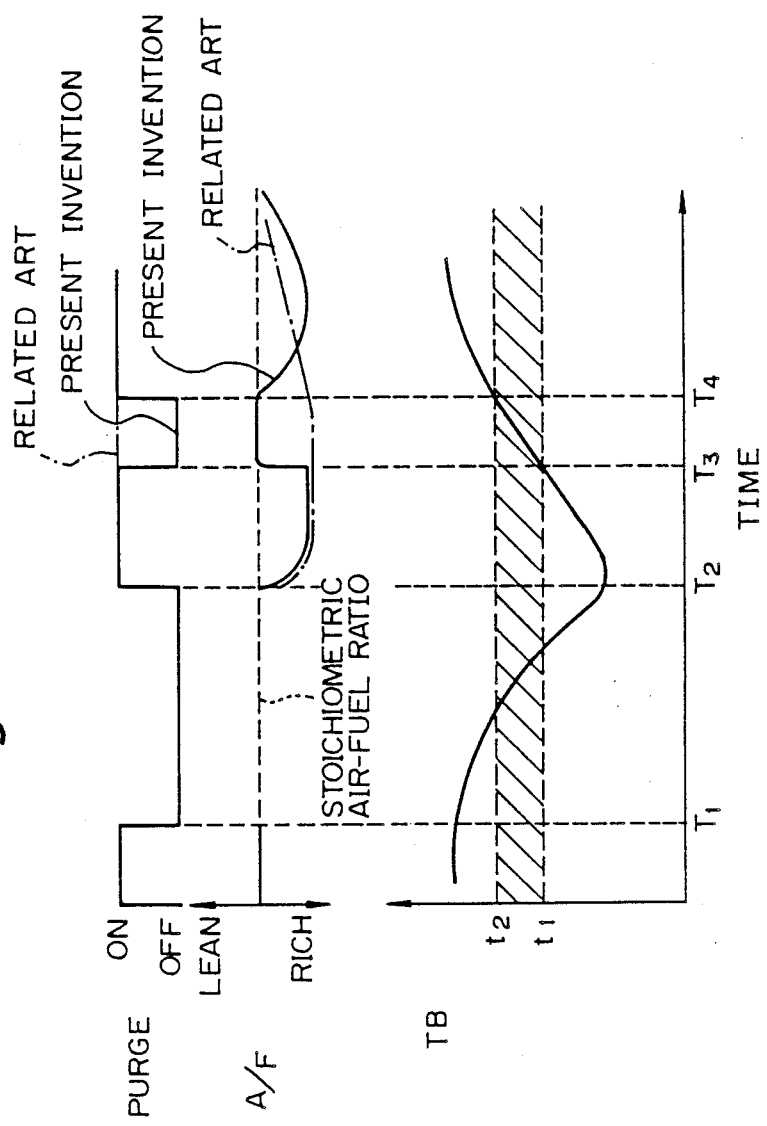
FIG. 5 is a operational diagram of an embodiment of this invention, compared with the related art.

FIG. 5 shows an operational diagram of this embodiment in comparison with a conventional system. In FIG. 5, "PURGE ON" means that purge gas purged from the charcoal canister 38 is fed into the intake duct 4, and "PURGE OFF" means that the first purge conduit 40 is closed by the control valve 42 and a purge is not carried out. The engine is operated to a point $T_1$, and then stopped. In a period from $T_1$ to $T_2$, fuel is supplied to the fuel tank 34, and at $T_2$, the engine is restarted and TB starts to rise. Since a large amount of fuel component is absorbed by the activated carbon 39 in the charcoal canister 38, when the engine is operated again, a large amount of fuel vapor purged from the charcoal canister 38 is fed into the intake duct 4, and thus an air-fuel mixture fed into the engine cylinders becomes extremely rich. In a period from $T_3$ to $T_4$, TB is in the temperature range between $t_1$ and $t_2$. When the temperature TB of the bed of the three-way catalyst 24 is higher than $t_1$ and lower than $t_2$, $H_2S$ might be produced. In the related art, in the period from $T_3$ to $T_4$, since a purge is carried out, i.e., purge gas is fed into the intake duct 4, an air-fuel mixture fed into the engine cylinders becomes extremely rich, and therefore, $H_2S$ is produced. In this embodiment, in the period from $T_3$ to $T_4$, since the purge is not carried out, i.e., purge gas is not fed into the intake duct 4 (when flag F is set), an air-fuel mixture fed into the engine cylinders does not become rich, and consequently $H_2S$ is not produced. Namely, after $T_4$, since TB is higher than $t_2$, $H_2S$ is not produced even when purge gas is fed into the intake duct 4.

While the invention has been described with reference to specific embodiments chosen for purposes of illustration, it should be apparent that numerous modifications can be made without departing from the basic concept and scope of the invention.

What is claimed:

1. An internal combustion engine having an intake passage and an exhaust passage, comprising:
   a charcoal canister for storing fuel vapor therein;
   a catalyst arranged in the exhaust passage;
   a determining means for determining whether or not a temperature of a bed of said catalyst is in a range substantially between 600° C. and 700° C. in which range hydrogen sulfide can be produced; and
   a control means for controlling an amount of purge gas purged from said charcoal canister and fed into the intake passage in accordance with a determination by said determining means to reduce the amount of said purge gas only when said catalyst is in said range between 600° C. and 700° C.

2. An internal combustion engine according to claim 1, wherein said catalyst is a three-way catalyst.

3. An internal combustion engine according to claim 1, wherein said determining means comprises a temperature sensor for detecting the temperature of the bed of said catalyst.

4. An internal combustion engine according to claim 1, wherein said control means comprises a purge passage connecting said charcoal canister to the intake passage, and a flow resistance controlling device for controlling a flow resistance of said purge passage.

5. An internal combustion engine according to claim 4, wherein said purge passage comprises a first passage, a second passage and a bypass passage, and said flow resistance controlling device comprises a control valve, said control valve being connected to said charcoal canister via said first passage and to the intake passage via said second passage, said bypass passage connecting said control valve to the intake passage, a flow resistance of said bypass being larger than a flow resistance of said second passage, said control valve being operable to communicate said first passage with said second passage or with said bypass passage.

6. An internal combustion engine according to claim 5, wherein a throat portion is provided in said bypass passage which is a portion of restricted airflow, and said control valve can shut off communication between said first passage and said second passage, and between said first passage and said bypass passage, at the same time.

7. An internal combustion engine according to claim 1, further comprising a fuel supply means for increasing an amount of fuel into the intake passage to make an air-fuel mixture fed into cylinders rich when the engine is in a predetermined operating state, said control means reducing the amount of said purge gas to a first amount of said purge gas when said catalyst is within said range and when said fuel supply means does not increase the amount of fuel, and further reducing the amount of said purge gas to a second amount of said purge gas when said catalyst is within said range and when said fuel supply means increases the amount of fuel, said second amount of said purge gas being less than said first amount of said purge gas.

8. An internal combustion engine according to claim 7, wherein said second amount of said purge gas is equal to zero.

9. An internal combustion engine according to claim 7, wherein said first amount of said purge gas is equal to about one third of a maximum amount of said purge gas.

10. An internal combustion engine according to claim 7, wherein said predetermined engine operating state is an acceleration state.

11. An internal combustion engine having an intake passage and an exhaust passage, comprising:

charcoal canister means for storing fuel vapor therein;

a catalyst arranged in the exhaust passage, for processing gases therein;

temperature detecting means, for determining whether a temperature of said catalyst is within a predetermined range between 600° C.–700° C. in which range hydrogen sulfide can be produced;

purge passage means, connecting said charcoal canister means to the intake passage, having a controllable flow rate; and control means for controlling an amount of purge gas through said purge passage means based on a determination by said temperature detecting means, such that an amount of purge gas is reduced only when said catalyst is in said range between 600° C.–700° C.

12. An engine as in claim 11 wherein said control means also includes means for:

determining if said engine is in a predetermined operating state which requires a rich air fuel mixture, and wherein said reducing, controlled by said control means, controls said purge gas flow to a first flow rate when said rich mixture is requested and to a second flow rate when said rich mixture is not requested, said first flow rate being a lower flow rate than said second flow rate.

13. An engine as in claim 12 wherein said determining operating state means of said control means includes means for determining whether a flag, indicating a rich fuel mixture, is set.

14. An engine as in claim 11 wherein said control means further includes means for determining a temperature of cooling water of the engine, and for controlling said purge passage means to a small amount when said water temperature is less than a predetermined value.

15. An engine as in claim 13 wherein said control means further includes means for determining a temperature of cooling water of the engine, and for controlling said purge passage means to a small amount when said water temperature is less than a predetermined value.

* * * * *